(12) United States Patent
Jokinen et al.

(10) Patent No.: US 9,807,384 B1
(45) Date of Patent: Oct. 31, 2017

(54) METHOD, APPARATUS AND COMPUTER PROGRAM PRODUCT FOR TESTING A DISPLAY

(71) Applicant: OptoFidelity Oy, Tampere (FI)

(72) Inventors: Kimmo Jokinen, Tampere (FI); Petteri Aimonen, Espoo (FI); Wen Cing-Yan Nivala, Tampere (FI)

(73) Assignee: OPTOFIDELITY OY, Tampere (FI)

( * ) Notice: Subject to any disclaimer, the term of this patent is extended or adjusted under 35 U.S.C. 154(b) by 0 days.

(21) Appl. No.: 15/405,783

(22) Filed: Jan. 13, 2017

(51) Int. Cl.
*H04N 17/00* (2006.01)
*G06F 1/16* (2006.01)

(52) U.S. Cl.
CPC .......... *H04N 17/004* (2013.01); *G06F 1/163* (2013.01)

(58) Field of Classification Search
CPC .... H04N 17/004; H04N 17/00; H04N 17/002; H04N 17/02; H04N 17/04; G06F 1/163; G02B 27/01; G02B 27/017; G02B 27/0172
USPC .................. 348/189, 180; 345/7, 8; 382/154
See application file for complete search history.

(56) References Cited

U.S. PATENT DOCUMENTS

2012/0243747 A1* 9/2012 Kielkopf ................ H04N 5/225
348/207.1

* cited by examiner

*Primary Examiner* — Sherrie Hsia
(74) *Attorney, Agent, or Firm* — Ziegler IP Law Group, LLC (57) ABSTRACT

Testing a head mounted display includes capturing a set of images shown by a display element; moving the display; and receiving motion information of the movement. A moment of time of the movement is detected as a first time instance. Contents of at least two images of the set of images are compared to determine whether at least a part of the information shown by the display element has been moved to another location. The comparison results are provided as a motion information of the image content. Movement in the set of images is detected on the basis of the motion information of the image content. The moment of the movement in the set of images is detected as a second time instance. A motion to photon latency is determined on the basis of the time difference between the second time instance and the first time instance.

11 Claims, 6 Drawing Sheets

METHOD, APPARATUS AND COMPUTER PROGRAM PRODUCT FOR TESTING A DISPLAY

TECHNICAL FIELD

The aspects of the disclosed embodiments relate to a method for testing a display. The aspects of the disclosed embodiments also relate to an apparatus for testing a display. The aspects of the disclosed embodiments further relate to computer program product for testing a display.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

So called head mounted displays are displays which a user would put on his/her head to view visual information provide by e.g. a mobile phone, a laptop, a tablet computer or some other device capable of producing images and/or video. Head mounted displays usually have two separate display elements, one for a left eye and one for a right eye of the user. However, some head mounted displays may use only one display so that a left part of the display is seen by the left eye and a right part of the display is seen by the right eye.

Head mounted displays may also comprise a movement detector which provides information of movements of the user's head. This movement information may be utilized by the information producing device to determine whether the displayed information should change. This may be the case when the user is watching so called 360 degrees panorama video or image. The panorama video contains information about the surroundings of the scene, but only a part of this scene is shown by the head mounted display. When the user turns his/her head, the head mounted display should follow this movement so that a different scene should be shown.

Head mounted displays may also be used in so called virtual reality (VR) and/or augmented reality (AR) applications in which the user may feel to be present in an environment shown by the head mounted display. In other words, the user is virtually present in the environment.

In practical implementations there may be a delay between the actual movement of the head and a corresponding change in the displayed information. This delay may be called as motion-to-photon latency. There may be several reasons which may affect the motion-to-photon latency. For example, the movement detector may have some delay before it sends information of a detected movement to the device, the device may have some delay before the received information of the detected movement is processed and used in determination of how the scene to be shown by the head mounted display should change as a consequence of the movement.

The degree of the motion to photon latency may affect how the user experiences the scene and changes of the scene shown by the head mounted display. Furthermore, the user may even feel sick if the motion to photon latency is too high (i.e. there is a long delay from the movement to the change in the display). High motion-to-photon latency could induce motion sickness and/or nausea, whereas a low motion-to-photon latency may improve the condition for presence.

In addition to motion-to-photon latency, there are also other aspects with head mounted displays which may affect the viewing experience, such as pixel persistence, frame jerkiness, frame jitter, dropped/duplicated frames, audio/video synchronization, application-to-motion latency and/or left versus right eye frame delay. Pixel persistence means the time the display uses to show the pixels. The pixel persistence value should be within specific time frame. Too long pixel persistence causes motion blur while too short pixel persistence may affect the brightness and contrast of the viewed video. Too long pixel persistence may be one of the reasons for motion sickness and user's nausea. Frame jerkiness is the average content update speed, also expressed as frames per second (fps). In some high-end virtual reality systems the frame jerkiness can be as high as 120 fps and is typically at least 60 fps. Frame jitter is the variation of content update, also expressed as standard deviation (in ms). Together with panning movement, which may be common in basic virtual reality usage, poor frame jitter may dramatically decrease the end-user perceived user experience. Dropped/duplicated frames are typically a sign of severe processing/synchronization issue. Also bandwidth issues can cause frames to drop. Dropped/duplicated frames may come together with frame jitter. Together with dynamic scene (e.g. panning movement), also dropped/duplicated frames may decrease the end-user perceived user experience. Audio/video synchronization is also an issue which may affect end-user perceived audiovisual experience. In multi-channel audio, all the audio channels should be synchronized with each other, as well as with the presented visual content. Audio/video synchronization and/or left versus right eye frame delay differences between left and right display refresh times (left versus right eye frame delay) may have annoying effect to the view experience.

Application-to-motion latency may be measured so that when a user moves her/his head, e.g. tilts and/or turns the head, sensors attached with the head mounted display detect the movement and provide an indication of the movement to a controller of the head mounted display. A signal may be sent to a simulation system, which determines how the image shown by the head mounted display should be changed. A new image will be generated accordingly and sent to the head mounted display to be displayed. The application-to-photon latency may be determined by the time it takes from the generation of the new image to actual display of the new image by the head mounted display. However, this measurement does not take into account the time it takes from the detection of the movement to the generation of the new image. Thus, the application-to-photon latency may indicate too short latency values compared to the actual motion-to-photon latency which the user experiences when using the head mounted display.

SUMMARY

One aim of the aspects of the disclosed embodiments is to provide a method and apparatus for testing a display such as a head mounted display.

Some embodiments provide a method for testing a display. In some embodiments the display to be tested is set on a test bed which may be rotated. The test bed may comprise a movement encoder which provides movement information to a testing apparatus. The testing apparatus comprises an image sensor such as an image sensor of a camera, which is set up so that the image sensor is able to view at least a part of a display element of the display and may recognize movements of the displayed image on the basis of the rotation. Motion-to-photon latency may then be determined on the basis of time difference between the actual movement of the test bed, indicated e.g. by the movement encoder, and the changes on the display detected by the image sensor.

Various aspects of examples of the aspects of the disclosed embodiments are provided in the detailed description.

According to a first aspect, there is provided a method for testing a display, the method comprising:
capturing a set of images shown by a display element of the display;
moving the display;
receiving motion information of the movement of the display;
detecting a moment of time of the movement of the display as a first time instance;
comparing contents of at least two images of the set of images to determine whether at least a part of the information shown by the display element has been moved to another location of the display element;
providing the comparison results as a motion information of the image content;
detecting movement in the set of images on the basis of the motion information of the image content;
determining the moment of the movement in the set of images as a second time instance; and
determining a motion to photon latency on the basis of the time difference between the second time instance and the first time instance According to a second aspect, there is provided an apparatus for testing a display, the apparatus comprising at least one processor; and at least one memory including computer program code the at least one memory and the computer program code configured to, with the at least one processor, cause the apparatus to perform at least the following:
capture a set of images shown by a display element of the display;
move the display;
receive motion information of the movement of the display;
detect a moment of time of the movement of the display as a first time instance;
compare contents of at least two images of the set of images to determine whether at least a part of the information shown by the display element has been moved to another location of the display element;
provide the comparison results as a motion information of the image content;
detect movement in the set of images on the basis of the motion information of the image content;
determine the moment of the movement in the set of images as a second time instance; and
determine a motion to photon latency on the basis of the time difference between the second time instance and the first time instance.

According to a third aspect, there is provided a computer readable storage medium stored with code thereon for use by an apparatus, which when executed by a processor, causes the apparatus to perform:
capture a set of images shown by a display element of the display;
move the display;
receive motion information of the movement of the display;
detect a moment of time of the movement of the display as a first time instance;
compare contents of at least two images of the set of images to determine whether at least a part of the information shown by the display element has been moved to another location of the display element;
provide the comparison results as a motion information of the image content;
detect movement in the set of images on the basis of the motion information of the image content;
determine the moment of the movement in the set of images as a second time instance; and
determine a motion to photon latency on the basis of the time difference between the second time instance and the first time instance.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

Figure 1:
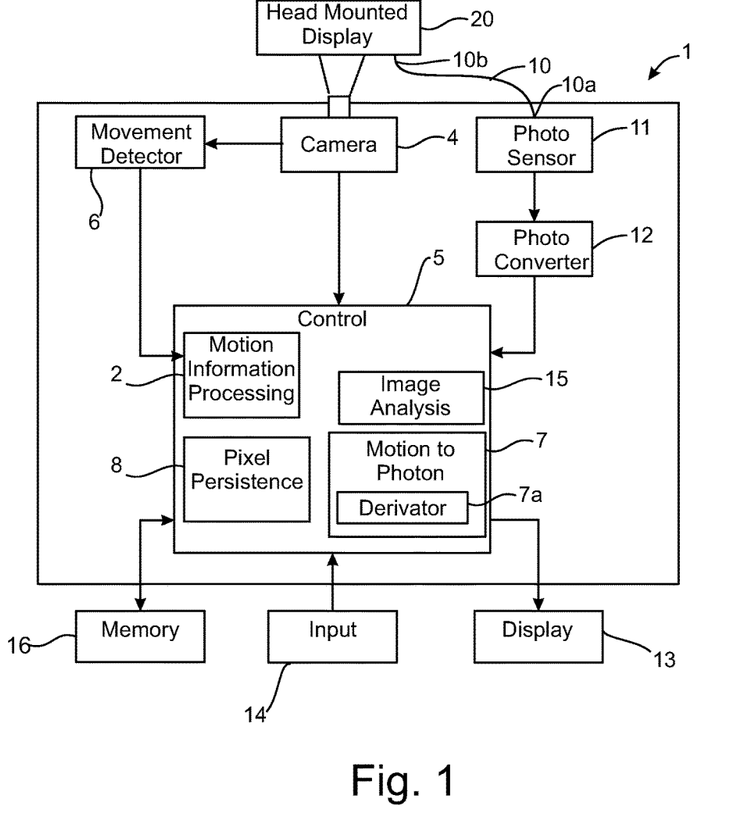
FIG. 1 is a simplified block diagram of a testing apparatus according to an example embodiment.
Figure 2:
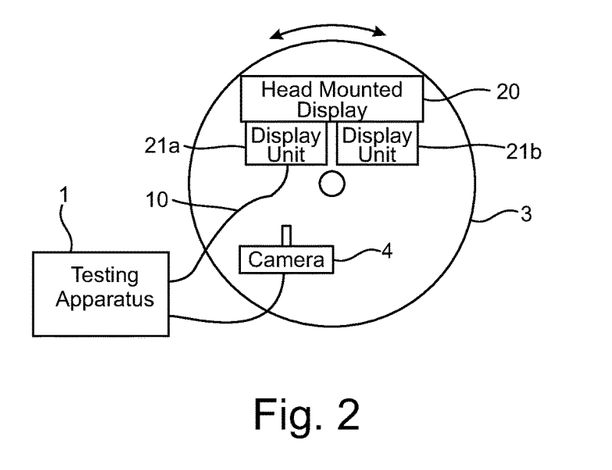
FIG. 2 illustrates an example situation in which a head mounted display is installed on a test bed, in accordance with an example embodiment.
Figure 4:
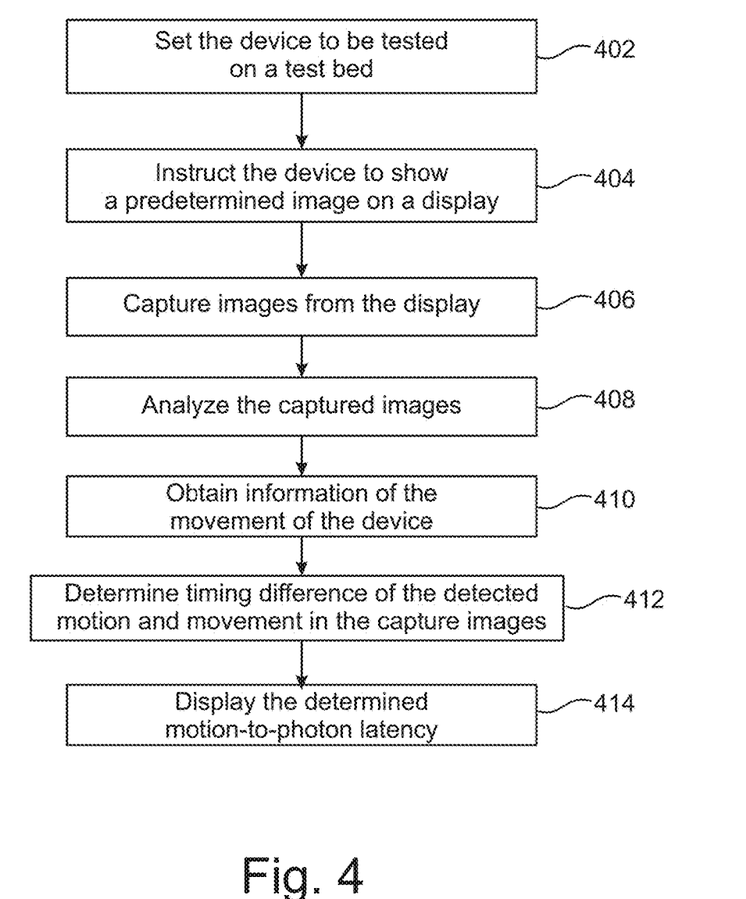
FIG. 4 shows a flow diagram of a method according to an example embodiment.

In the following some example embodiments will be described. FIG. 1 is a simplified block diagram of a testing apparatus 1 according to an example embodiment of the present invention, FIG. 2 illustrates a test setup for testing a display 20 according to an example embodiment of the present invention and FIG. 4 is a flow diagram of a method according to an example embodiment of the present invention. In this example the display 20 is a head mounted display, but the test setup may also be used to test other kinds of display. The testing apparatus 1 comprises a control block 5, which is adapted to control operations of the testing apparatus 1. The testing apparatus 1 also comprises a camera 4 intended to capture images during testing a head mounted display 20. The camera 4 should be arranged so that it remains in the same position with respect to the head mounted display 20 during testing. In accordance with an embodiment, this is arranged so that the camera 4 is attached with a test bed 3 (FIG. 2). The test bed 3 may be at least horizontally rotatable to simulate movements of a user's head as will be described later in this specification. In accordance with an embodiment, the test bed 3 may also be rotatable in a direction orthogonal to the horizontal direction i.e. in a vertical direction. The testing apparatus 1 further comprises a test bed movement detector 6 which may provide signals to the control block 5 on the basis of the movement of the test bed 3. The control block 5 may comprise a motion information processing block 2, which may process the motion information received from the movement detector 6 into a form which may be used to determine how the test bed 3 and the head mounted display 20 attached to the test bed 3 have been moving. The testing apparatus 1 also has a photo sensor 11 attached with one end 10a of an optical fiber 10, such as a plastic optical fiber (POF) or a glass optical fiber (GOF). The optical fiber 10 transmits light through a core of the optical fiber 10 to the photo sensor 11. Another end 10b of the optical fiber 10 can be used to attach it on the surface of a display 21a, 21b of the head mounted display 20. A photo converter 12 converts the output of the photo sensor 11 to digital samples.

It should be noted that it is also possible to use another camera or an optical sensor instead of the optical fiber 10 and the photo sensor 11. In accordance with an embodiment the optical fiber 10 may comprise a plurality of optical fibers i.e. a bunch of optical fibers.

The testing apparatus 1 may further comprise a memory 16 for storing data and/or computer code for operating the testing apparatus 1, a display 13 for displaying information to a user of the testing apparatus 1, and input means 14 such as a keyboard and/or a pointing and/or a touch sensor and/or microphone and/or some other input device, etc. for receiving instructions from the user.

The sensor element of the camera 4 need not have very high resolution but a low resolution sensor element may provide enough information for the testing procedure. As an example, the camera 4 may be a so called optical flow camera often used in computer mice to track movements of the computer mouse. The resolution of the sensor element of such cameras is couple of tens of pixels in both x and y directions, for example 30×30 pixels, but is relatively high speed so that it can capture enough frames per second (fps) to track changes on the display fast enough.

Figure 5:
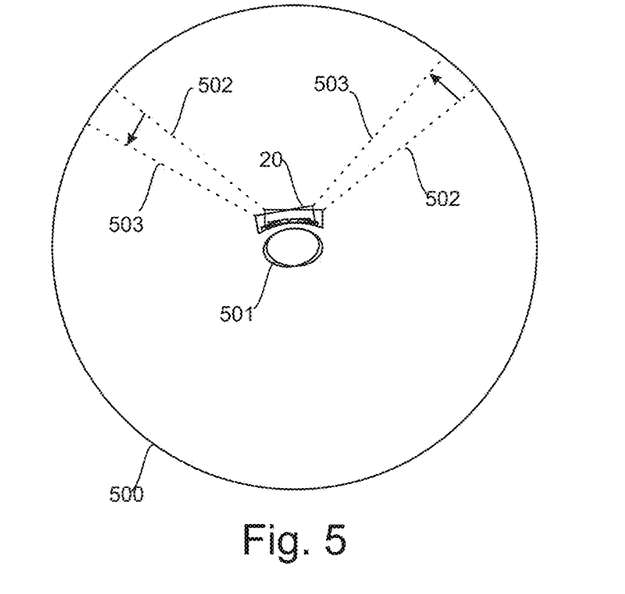
FIG. 5 illustrates a panorama image viewed by a head mounted display.

FIG. 5 illustrates an example where a panorama image 500 is viewed by a head mounted display 20 by a user 501. The head mounted display 20 shows only a part of the panorama image 500. This part is illustrated with dotted lines 502. When the user 501 turns his/her head, the image shown by the head mounted display 20 should also change accordingly so that the user sees another part of the panorama image 500. This change of view is illustrated with arrows and dotted lines 503 in FIG. 5.

In the following the operation of the testing apparatus 1 is explained in more detail. It is assumed that the head mounted display 20 has two separate display units 21a, 21b, one display 21a for the left eye and another display 21b for the right eye, but similar testing method can also be applied when testing a head mounted display 20 in which the same display 21 is used for displaying images for both the left and right eye. Furthermore, if differences between the left and right display should be measured, the testing apparatus 1 may comprise two cameras 4 and two photo sensors 11 and two fibers 10 so that similar operations may be performed substantially simultaneously.

The head mounted display 20 is placed 402 to the test bed 3 and a test image or a test video may be shown 404 by the displays 21a, 21b of the head mounted display 20. The second end 10b of the optical fiber 10 is put on the surface of the display 21a, 21b of the head mounted display 20. In accordance with an embodiment, the second end 10b of the fiber is put substantially on the same horizontal location than the camera 4 i.e. the second end 10b and the camera 4 are vertically aligned. The control block 5 controls the camera 4 to capture images 406 from one of the displays 21a, 21b. The capture rate of the camera 4 is substantially the same than the display rate of the display 21a, 21b of the head mounted display 20. This may be achieved, for example, so that optical information transferred via the optical fiber 10 and detected by the photo sensor 11 is used to detect changes of frames displayed by the display 20 and the camera 4 is controlled to capture images at the same pace than the display rate of the display 20. Captured images may be stored into the memory 16 by the control block 5 and the stored images may be analyzed by the image analyzer block 15.

The image analyzer block 15 may compare contents of successive images to determine 408 how the information shown by the head mounted display 20 has changed. These changes may reveal e.g. how much an image has been moved e.g. in the horizontal direction and/or in the vertical direction. This movement information may be output by the image analyzer block 15 e.g. as a continuous stream of values which indicate the actual movement of the image on the display 21a, 21b. This information may be provided to a motion-to-photon calculation element 7 for further use.

The movement detector 6 produces signals on the basis of movements of the test bed 3 wherein the control block 5 can use this information to determine when the test bed 3 and correspondingly the head mounted display 20 moves. As was mentioned before, the movement information may include, for example, rotation in a horizontal direction, rotation in a horizontal direction or both. However, the movement information may additionally or instead comprise other kinds or movement data.

Figure 3A:
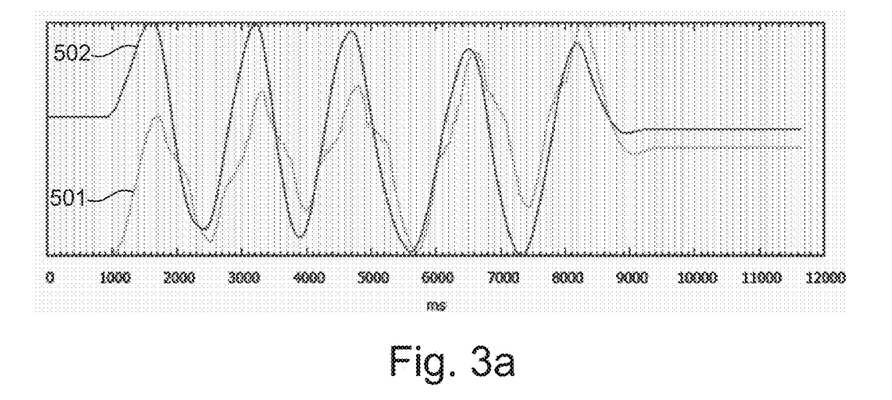
FIG. 3a-3f show examples of signals produced by an image analyzer block and a movement detector to be used in motion-to-photon latency determination and some motion-to-photon latency calculation results obtained from the signals, in accordance with an example embodiment depicts an example of a setup for testing a device.

FIG. 3a shows an example of signals produced by the image analyzer block 15 (curve 501 in FIG. 3a) and the movement detector 6 (curve 502 in FIG. 3a). It can be seen that the curve 501 lags some milliseconds the signal from the motion detector 6.

Figure 6:
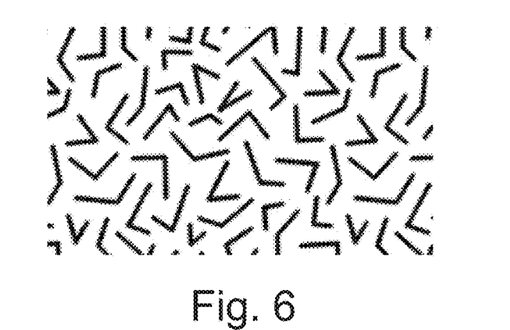
FIG. 6 shows an example of a test image.

FIG. 6 shows a non-limiting example of a test image but also other kinds of images may be used. The test image of FIG. 6 has some patterns having substantially sharp edges (e.g. black patterns on a white background or vice versa) and many of the patterns are kind of arrow head patterns having different rotation angles with reference to the x- and y-coordinates of the display 20.

Figure 3B:
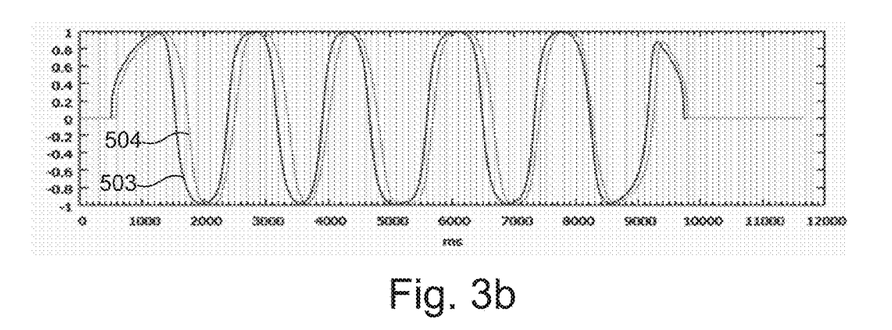

The motion-to-photon calculation element 7 receives 410 the movement information and uses it as an indication how the head mounted display 20 moves. The motion-to-photon calculation element 7 may use 412 the motion information from the image analyzer block 15 and motion information from the movement detector 6 to compute motion-to-photon latency. This computation may include, for example, one or more of the following. The motion-to-photon calculation element 7 may comprise a derivation element 7a which performs a derivation operation to both the motion information from the image analyzer block 15 (curve 503 in FIG. 3b) and motion information from the movement detector 6 (curve 504 in FIG. 3b). FIG. 3b illustrates an example of the derivation when a sliding window of 50 samples has been used in the derivation. Curve 503 is the derivation result of the motion information from the image analyzer block 15 and curve 504 is the derivation result of the motion information from the movement detector 6. Values may be normalized between −1 . . . +1 using e.g. regression:

$$r_{xy} = \frac{\overline{xy} - \overline{x}\overline{y}}{\sqrt{(\overline{x^2} - \overline{x}^2)(\overline{y^2} - \overline{y}^2)}} \quad (1)$$

In these curves the motion-to-photon latency can be clearly seen.

Figure 3C:
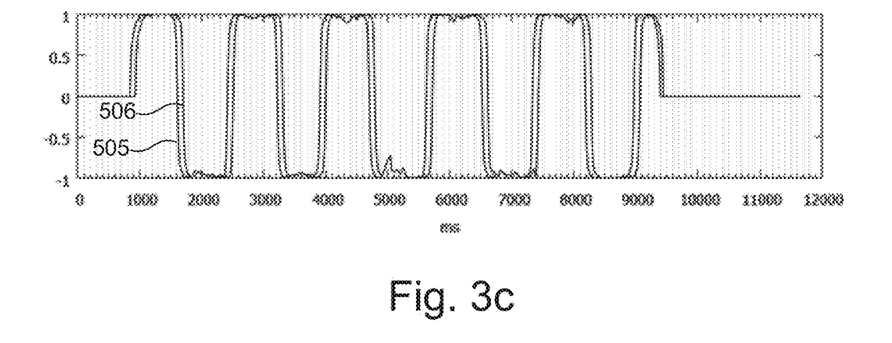

FIG. 3c illustrates an example of the derivation when a sliding window of 10 samples has been used in the derivation. Curve 506 is the normalized derivation result of the motion information from the image analyzer block 15 and curve 505 is the normalized derivation result of the motion information from the movement detector 6.

Figure 3D:
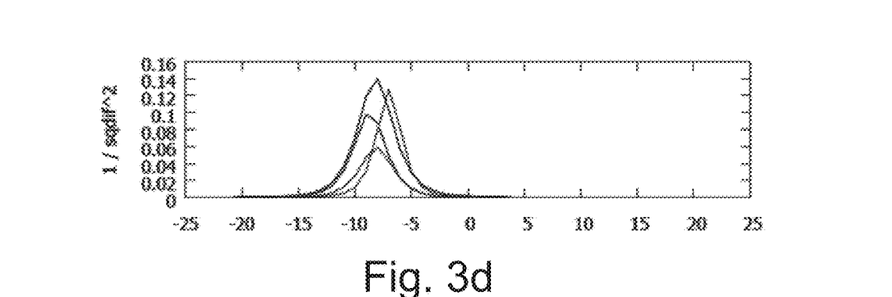
Figure 3E:
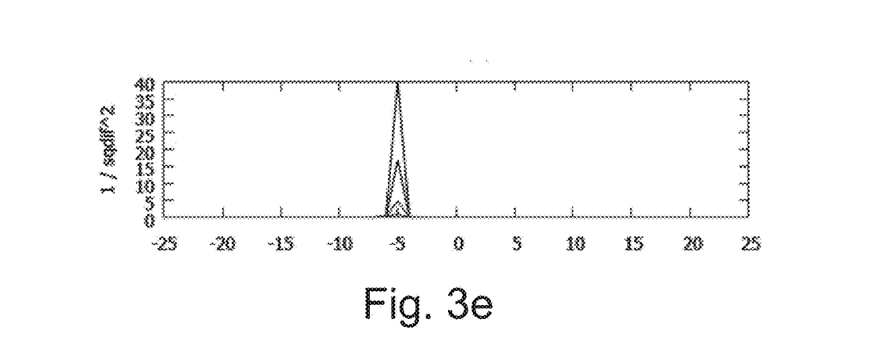
Figure 3F:
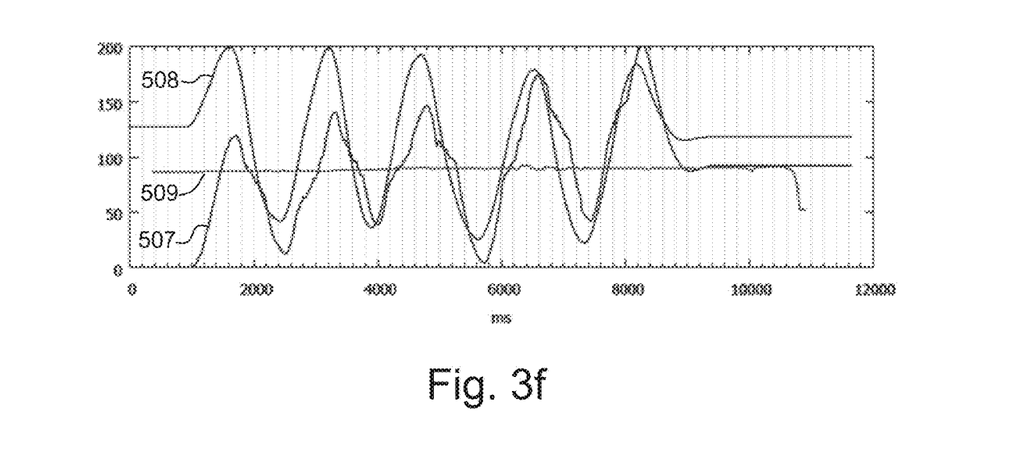

Some other examples of determining the time delay between the motion information from the image analyzer block 15 and motion information from the movement detector 6, i.e. the motion-to-photon latency, are cross-correlation and sum of squared differences. FIG. 3d shows an example result of cross-correlation with the sliding window of 50 samples in the derivation phase, and FIG. 3e shows an example result of cross-correlation with the sliding window of 10 samples in the derivation phase with four different measurement lengths (1000 ms, 2000 ms, 3000 ms and 4000 ms). FIG. 3f shows results of motion-to-photon latency at a certain time range. Curve 507 shows the motion information from the image analyzer block 15, curve 508 shows motion information from the movement detector 6, and curve 509 shows the determined motion-to-photon latency.

In accordance with an embodiment, the testing apparatus 1 may also display 414 the curves 501, 502 and provide the determined motion-to-photon latency as a numeral indication.

The test image or video to be shown by the head mounted display 20 may contain patterns which are relatively easy to distinguish from each other. In other words, the patterns should have quite sharp edges so that when the head mounted display is rotated, the pattern will be shown at a different location on the display elements 21a, 21b and the camera 4 should be able to detect the amount of displacement. As an example, the patterns could be black-and-white patters (or black patterns on a white background or vice versa). The edges of the patterns could also appear in different directions, not only in one direction. For example, some of the edges could be vertical, some horizontal, and some edges could be inclined with respect to the horizontal and vertical edges of the display elements 21a, 21b. Hence, it may be easier for the image analyzer 15 of the testing apparatus 1 to detect movements of the image shown by the head mounted display 20.

In the following, pixel latency determination will be described in more detail. The photo sensor 11 receives illumination via the optical fiber 10 and produces an electric signal proportional to the strength of the illumination. The electric signal is converted by the converter 12 into samples indicative of the amount of illumination detected. The electric signal may comprise one luminance component or different components for different colors (red, green, blue) wherein pixel persistence may be measured for all colors of the display 21a. 21b. The samples may be used by a pixel persistence determination element 8 to compute pixel persistence and possibly pixel rise time and/or pixel fall time.

The photo sensor 11 may also be used to detect possible markers included in a video stream to detect frame changes and possibly dropped frames and/or duplicated frames. Such a marker may be a two-stage marker or have multiple states. The two-state marker may change the color or illumination level between two states (black/white, for example) for example after each frame so that in every other frame the marker has a first state and in every other frame the marker has a second state. In a multi-state embodiment the marker may have more than two different colors or illumination levels wherein the marker may have a different color in each successive frame and the colors may vary according to a sequence of states. If the detected sequence of states of the marker is not following the assumed sequence of states, it may indicate a dropped frame or a duplicated frame. This may be indicated by the testing apparatus 1 to the user.

In accordance with an embodiment, the testing apparatus 1 may also measure frame jerkiness, frame jitter, audio/video synchronization and/or left versus right eye frame delay. Frame jerkiness may be measured by examining captured images to detect moments of time when the head mounted device 20 displays a frame, wherein it is possible to calculate an average content update speed, which may also be expressed as frames per second (fps).

Frame jitter is the variation of content update, also expressed as standard deviation (in ms), wherein the captured images and timing information of the captured images may be used to determine variations in the content update.

Figure 7:
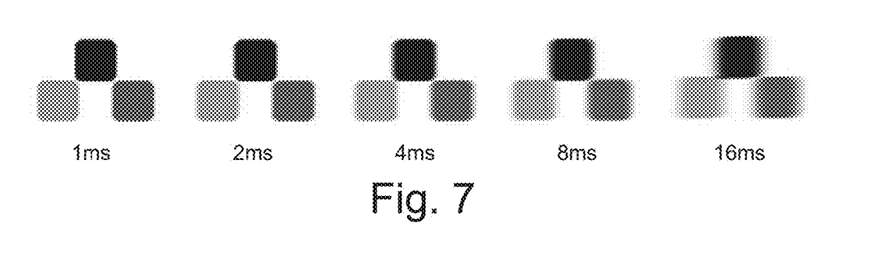
FIG. 7 is an example illustration of perceived motion blur.

Liquid crystal displays (LCD), for example, may have totally different responses for primary colors (red, green, blue), causing multi-spectral ghosting artifacts. FIG. 7 illustrates how the certain persistence values might be perceived as motion blur. Different colours (red, green, blue) are indicated with different grades of grey in FIG. 7. Ghosting artifacts can be divided onto three main types:

Asymmetric pixel transitions (ghosting, trailing motion artifact);

Response time acceleration (coronas, pixel overshoot); and

Pulse-width modulation (PWM) artifacts (repeated images, motion fluidity issues).

Since the roots for the above artifacts are all in response characteristics of an LCD display, dynamic movement of sensor and/or display contents is not needed but a stationary setup may be used. In accordance with an embodiment, dynamic target images with stationary measurement setup may be used, wherein the fiber 10 and the optical sensor 11 may be used to detect the dynamic test patterns shown by the display 20. The dynamic test pattern may comprise a repeating sequence of different colors such as red, green and blue so that there are 50% color values before and after 100% color component. The changing rate of the colors may be different in different implementations, but in accordance with an example, the changing rate is 0.5 s. For example, at first the pattern is black, followed by a red component having 50% intensity, then the red component having 100% intensity, and again the red component having 50% intensity. The next "pattern" may be black followed by a blue component, first at 50% intensity, then at 100% intensity, and again at 50% intensity. After the next black pattern, there could be a green component, first at 50% intensity, then at 100% intensity, and again at 50% intensity. This sequence may be repeated several times. The testing apparatus may measure the response curve for each color component, which would produce rise and fall curves for each color, thus providing the asymmetric pixel transitions and response time acceleration.

Ghosting may appear stronger on certain spatial locations. Therefore, the optical fiber 10 could be attached to multiple positions along the display 20 to examine ghosting at different spatial locations of the display 20.

In the following, an example how a virtual reality controller may be tested will be explained. The virtual reality controller may be used, for example, as a pointer for head mounted displays and as a movement controller similarly to a traditional computer mouse. The head mounted display should give response to movements of the virtual reality controller. The response depends on what operations the user performs with the virtual reality controller. The time between the actual control operation and the response by the virtual reality controller may affect the feeling of presence of the user so that the longer the delay the less realistic the user may feel the mutual operation of the virtual reality controller and the head mounted display. This delay may be called as a control to photon latency. The test setup may be as follows. The virtual reality controller is put on the test bed 3 and the head mounted display 20 is kept stationary. A test image can be displayed by the head mounted display 20 and moved as a response to movements of the virtual reality controller. The camera 4 is viewing the head mounted display 20 and the optical fiber 10 may be attached on the surface of the head mounted display 20. However, the fiber 10 may not be needed if only images captured by the camera 4 are used in the analysis. The test bed 3 may then be moved (e.g. by rotating and/or tilting) to imitate user's movements of the virtual reality controller. The test bed movement detector 6 provides signals to the control block 5 on the basis of the movement of the test bed 3. Captured images may be analyzed to detect changes as a response to the movement of the test bed 3 and the virtual reality controller. Time difference between the detected movement and the detected changes on the information displayed by the head mounted display corresponds with the control to photon latency.

In accordance with an embodiment, the test bed 3 is not needed but the virtual reality controller may be moved manually. Hence, a movement detector may be needed with the virtual reality controller to signal movement information to the control block 5.

It should be noted that the head mounted display 20 need not be stationary but may, for example, be located on the test bed 3 together with the camera 4 so that the head mounted display 20 and the camera 4 will not move with respect to each other.

Measuring audio/video synchronization may be performed, for example, so that the head mounted display 20 is instructed to output a sound signal, which may be captured by a microphone of the testing apparatus 1. Time difference between a detected sound signals and a captured image may be used as an indication how well or badly the audio and video are synchronized.

Figure 8:
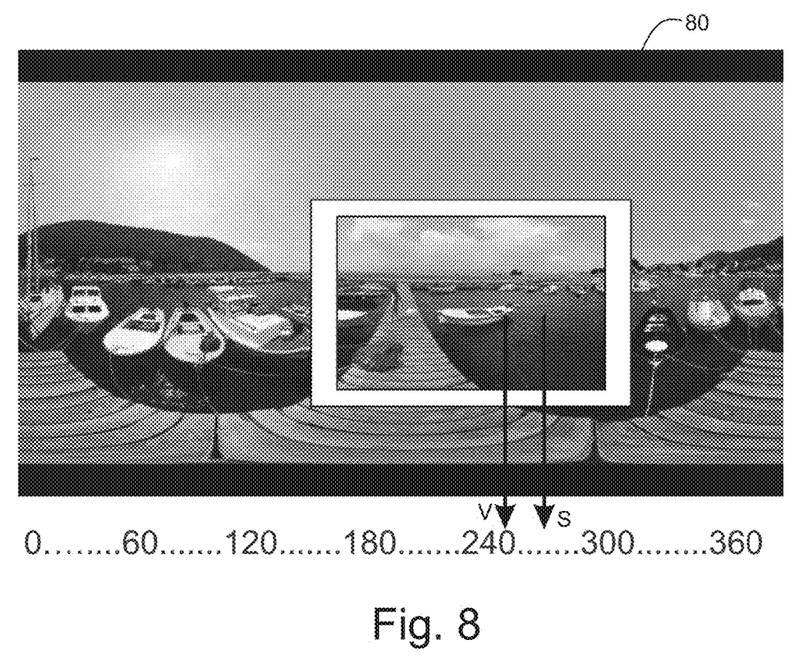
FIG. 8 illustrates an example of motion to audio latency.

Motion to audio testing may also include determination of an angle of arrival of the audio signal. Hence, the angle of arrival of the audio signal may reveal the accuracy with which the audio signal is following movements of the head mounted display. An example of the motion to audio latency is illustrated in FIG. 8. The user may watch a panorama video 80 in which one or more audio sources are seen, wherein the system should generate audio signal so that the user recognizes the direction from where the audio signal arrives. That direction should correspond with the direction of the source of the audio signal. If the user turns his/her head, the direction of arrival of the audio signal should still correspond with the direction of the source of the audio signal in the display. Therefore, if there is a difference between the direction of arrival of the audio signal and the visual location of the source of the audio signal, the user may experience it annoying. The arrow V in FIG. 8 illustrates the actual direction of a sound source and the arrow S in FIG. 8 illustrates the direction of the sound generated by the system. In an ideal situation these arrows V, S should point the same angle i.e. be overlapping in the figure.

The direction of arrival of the audio signal may be determined, for example, by using two microphones for receiving audio signals from left and right loudspeakers and measuring a phase difference between the received audio signals. The phase difference may indicate the direction of arrival of the audio signal. However, also other methods may be used in the determination of the direction of arrival.

It should be noted that the above described measurements may be performed for both the left display 21a and the right display 21b, wherein differences between the left display 21a and the right display 21b may be determined such as left versus right eye frame delay differences between left and right display refresh times (left versus right eye frame delay).

In multi-channel audio, all the audio channels should be synchronized with each other, as well as with the presented visual content, wherein if the testing apparatus 1 comprises at least as many microphones as there are audio channels, the testing apparatus 1 may be able to determine how well different audio channels are synchronized with each other.

In the following some examples will be provided.

According to a first example, there is provided a method for testing a display capable of showing images, the method comprising:

capturing a set of images shown by a display element of the display;

moving the display;

receiving motion information of the movement of the display;

detecting a moment of time of the movement of the display as a first time instance;

comparing contents of at least two images of the set of images to determine whether at least a part of the information shown by the display element has been moved to another location of the display element;

providing the comparison results as a motion information of the image content;

detecting movement in the set of images on the basis of the motion information of the image content;

determining the moment of the movement in the set of images as a second time instance; and determining a motion to photon latency on the basis of the time difference between the second time instance and the first time instance.

In some embodiments the method comprises derivating the motion information of the movement of the display and the motion information of the image content using a sliding window; and determining the motion to photon latency on the basis of the derivation results In some embodiments the method comprises:

cross-correlating the derivation results; and determining the motion to photon latency on the basis of results of the cross-correlation.

In some embodiments the method further comprises:

receiving illumination information from the display element;

forming a set of illumination samples on the basis of the received illumination information; and using the set of illumination samples to determine pixel persistency of the display element.

In some embodiments the set of images comprises images of a video including a marker, wherein the method further comprises:

receiving illumination information of the marker shown by the display element;

forming a set of illumination samples on the basis of the received illumination information;

detecting a change in the marker on the basis of the samples of the set of illumination samples; and using time information of the detected change to determine at least one of the following:
a dropped frame;
a duplicated frame.

In some embodiments the method comprises:
using a head mounted display as the display to be tested.

According to a second example, there is provided an apparatus for testing a display, the apparatus comprising at least one processor; and at least one memory including computer program code configured to, with the at least one processor, cause the apparatus to perform at least the following:
capture a set of images shown by a display element of the display;
move the display;
receive motion information of the movement of the display;
detect a moment of time of the movement of the display as a first time instance;
compare contents of at least two images of the set of images to determine whether at least a part of the information shown by the display element has been moved to another location of the display element;
provide the comparison results as a motion information of the image content;
detect movement in the set of images on the basis of the motion information of the image content;
determine the moment of the movement in the set of images as a second time instance; and
determine a motion to photon latency on the basis of the time difference between the second time instance and the first time instance.

In some embodiments of the apparatus:
the display to be tested is a head mounted display.

According to a third example, there is provided a computer program product for testing a display capable of showing images at a first resolution, the computer program product stored on a tangible medium with code thereon for use by an apparatus, which when executed by a processor, causes the apparatus to:
capture a set of images shown by a display element of the display;
move the display;
receive motion information of the movement of the display;
detect a moment of time of the movement of the display as a first time instance;
compare contents of at least two images of the set of images to determine whether at least a part of the information shown by the display element has been moved to another location of the display element;
provide the comparison results as a motion information of the image content;
detect movement in the set of images on the basis of the motion information of the image content;
determine the moment of the movement in the set of images as a second time instance; and determine a motion to photon latency on the basis of the time difference between the second time instance and the first time instance.

The invention claimed is:

1. A method for testing a display capable of showing images at a first resolution, the method comprising:
capturing a set of images shown by a display element of the display;
moving the display;
receiving motion information of the movement of the display;
detecting a moment of time of the movement of the display as a first time instance;
comparing contents of at least two images of the set of images to determine whether at least a part of the information shown by the display element has been moved to another location of the display element;
providing the comparison results as a motion information of the image content;
detecting movement in the set of images on the basis of the motion information of the image content;
determining the moment of the movement in the set of images as a second time instance; and
determining a motion to photon latency on the basis of the time difference between the second time instance and the first time instance.

2. The method of claim 1 comprising:
derivating the motion information of the movement of the display and the motion information of the image content using a sliding window; and
determining the motion to photon latency on the basis of the derivation results.

3. The method of claim 2 comprising:
cross-correlating the derivation results; and
determining the motion to photon latency on the basis of results of the cross-correlation.

4. The method of claim 1 comprising:
receiving illumination information from the display element;
forming a set of illumination samples on the basis of the received illumination information; and
using the set of illumination samples to determine pixel persistency of the display element.

5. The method of claim 1, wherein the set of images comprises images of a video including a marker, wherein the method further comprising:
derivating the motion information of the movement of the display and the motion information of the image content using a sliding window; and
determining the motion to photon latency on the basis of the derivation results.

6. The method of claim 1 comprising:
using a head mounted display as the display to be tested.

7. An apparatus for testing a display, the apparatus comprising at least one processor; and at least one memory including computer program code configured to, with the at least one processor, cause the apparatus to perform at least the following:
capture a set of images shown by a display element of the display;
move the display;
receive motion information of the movement of the display;
detect a moment of time of the movement of the display as a first time instance;
compare contents of at least two images of the set of images to determine whether at least a part of the information shown by the display element has been moved to another location of the display element;
provide the comparison results as a motion information of the image content;
detect movement in the set of images on the basis of the motion information of the image content;
determine the moment of the movement in the set of images as a second time instance; and
determine a motion to photon latency on the basis of the time difference between the second time instance and the first time instance.

8. The apparatus of claim 7, said at least one memory including computer program code configured to, with the at least one processor, cause the apparatus to perform:
   derivate the motion information of the movement of the display and the motion information of the image content using a sliding window; and
   determine the motion to photon latency on the basis of the derivation results.

9. The apparatus of claim 8, said at least one memory including computer program code configured to, with the at least one processor, cause the apparatus to perform:
   cross-correlate the derivation results; and
   determine the motion to photon latency on the basis of results of the cross-correlation.

10. The apparatus of claim 7, wherein:
    the display to be tested is a head mounted display.

11. A computer program product for testing a display capable of showing images at a first resolution, the computer program product stored on a tangible medium with code thereon for use by an apparatus, which when executed by a processor, causes the apparatus to:
   capture a set of images shown by a display element of the display;
   move the display;
   receive motion information of the movement of the display;
   detect a moment of time of the movement of the display as a first time instance;
   compare contents of at least two images of the set of images to determine whether at least a part of the information shown by the display element has been moved to another location of the display element;
   provide the comparison results as a motion information of the image content;
   detect movement in the set of images on the basis of the motion information of the image content;
   determine the moment of the movement in the set of images as a second time instance; and
   determine a motion to photon latency on the basis of the time difference between the second time instance and the first time instance.

* * * * *